3,510,328
ASPHALTIC COMPOSITIONS
Robert B. Crean, Searington, N.Y., assignor to Mobil Oil Corporation, a corporation of New York
No Drawing. Continuation-in-part of application Ser. No. 469,343, July 2, 1965. This application Apr. 4, 1969, Ser. No. 813,729
Int. Cl. C08h 13/00; C09d 3/24
U.S. Cl. 106—273
4 Claims

ABSTRACT OF THE DISCLOSURE

Asphaltic compositions are provided which are obtained by polymerizing a petroleum asphalt having a specific gravity of at least about 1.1 and a benzene insolubles content of up to 1.3 percent by weight in the presence of at least about 0.6 percent by weight of oxygen based upon the weight of asphalt present and at a temperature in the range from above 850° F. to about 1000° F. to produce a petroleum asphalt of increased specific gravity and having an increased benzene insolubles content not greater than about 25.6 percent by weight.

CROSS-REFERENCE TO RELATED APPLICATIONS

Continuation-in-part of application Ser. No. 469,343, filed July 2, 1965, now abandoned.

BACKGROUND OF THE INVENTION

Field of the invention

This invention, which is a continuation-in-part of my application Ser. No. 469,343, filed July 2, 1965, relates to improved asphaltic compositions, and, in one of its aspects, relates more particularly to improved asphaltic compositions suitable for use as binders in the manufacture of molded carbonaceous articles. Still more particularly in this aspect, the invention relates to the production of improved asphaltic compositions in the form of a pitch, suitable for use as a binder in the manufacture of molded carbonaceous articles, such as carbon electrodes.

In the manufacture of molded carbonaceous materials, such as the aforementioned carbon electrodes, calcined coke is generally employed as the starting material. Inasmuch as the coke possesses no natural adhesives, it must be bound together, in the desired shape, with a compatible material. Thus, for example, in the manufacture of carbon electrodes, the coke is usually ground, mixed with a binder, molded and then baked to carbonize the binder. Binders employed for these purposes, must be sufficiently fluid at the temperature at which they are mixed with the solid coke in order to completely wet and penetrate the latter. Furthermore, the binder should have a relatively stable viscosity when subjected to temperatures as high as about 200° C. By reason of these stringent requirements, commercially employed pitch binders have been made, almost exclusively, from selected coal-tar products.

Binders, employed in the production of molded carbonaceous articles, particularly carbon electrodes, should, in general, comprise a stable hydrocarbon mixture of uniform consistency and quality, and should be substantially free from contaminants. Among the contaminants which have heretofore prevented the use of petroleum-derived pitch in carbonaceous articles, are coke-like materials. The term "coke" or "coke-like materials," as employed herein, denotes a hydrocarbon having a carbon to hydrogen atomic ratio of about 2.0 or higher, and is, generally, produced as a result of excessive polymerization and condensation reactions, which are necessary for obtaining a pitch binder having the desired properties. A satisfactory pitch binder, suitable for use in the manufacture of carbon electrodes, can hold in stable suspension only about 2.5 weight percent of coke-like materials. At coke concentrations greater than about 2.5 weight percent, it is found that the excess coke-like material tends to agglomerate and to separate from the pitch, producing a non-uniform product, and providing a non-uniform binder. Further, it causes line and pump plugging and reduces the service life of reaction chamber tubes. This coke-like material has been found to have poor binding properties, and does not contribute to the desired characteristics of the finished product. The presence of excess coke in petroleum-derived pitch, therefore, is one of the main factors in decreasing bonding characteristics of the binder pitch, resulting in migration during baking treatment of carbon electrodes, and leaving areas of unbonded carbon in the finished article. In this condition, a carbon electrode, employing a petroleum pitch binder, is produced having uneven mechanical strength, and is variable in electrical conductivity. For these reasons, petroleum pitches have heretofore not been considered as satisfactory binders, since they fail to meet the stringent requirements of commercially desirable pitch binders. Thus, commercial pitch binders have heretofore been produced, almost exclusively, from coal tar. Moreover, in some applications, the presence of excessive sulfur in the aforementioned electrodes, causes deleterious effects during ore reduction. The low-sulfur content of the charge-stock employed in the present invention is another advantage to be realized.

Description of the prior art

The prior art contemplates a method of preparing a pitch binder from petroleum-derived hydrocarbons. This method comprises thermally cracking a high-boiling hydrocarbon fraction, and passing the hot cycle residue into a soaking tank of substantial capacity and maintained under super-atmospheric pressure. The flow of the cycle residue is regulated through the soaking tank, so that the residence time for any given increment of feedstock ranges from about 3 to about 5 hours. The initial pitch thus produced is not considered satisfactory and is recycled through the soaking tank to improve its quality. However, at a certain critical soaking time period, an excessive amount of coke-like material is produced in the upgrading of the pitch product, while some of the excess coke separates and tends to accumulate on the walls, bottom, and other surfaces in the soaking tank. This condition, therefore, requires an extensive cleaning operation to remove undesired accumulated coke. Further, in a continuous process, where tube-shaped reactors are used, this coke-like material accumulates on inner surfaces, thus affecting lineal velocities and, therefore, reduces residence times. This coke-like material also serves to increase the need for high heat densities.

In addition, the excess coke thus produced contaminates the pitch product and provides the undesirable characteristics of a non-uniform pitch binder, as hereinbefore described. Furthermore, the extended soaking operation of the prior art, as employed on a commercial basis, is found to be time consuming and expensive for improving the quality of the pitch binder. Thus, prior to the present invention, the preparation of pitch binders from petroleum hydrocarbons obtained by the thermal cracking of high boiling petroleum hydrocarbon fractions, has not proved to be commercially attractive.

SUMMARY OF THE INVENTION

In accordance with the present invention, as more fully hereinafter described, an improved asphaltic composition is provided by polymerizing a petroleum asphalt, derived from the thermal (including catalytic) processing of petroleum hydrocarbons, having a specific gravity of at least about 1.1 and a benzene insolubles content of up to 1.3 percent by weight, in the presence of at least about 0.06 percent by weight of oxygen based upon the weight of asphalt present and at a temperature in the range from above 850° F. to about 1000° F., for a time sufficient to produce petroleum asphalt or pitch of increased specific gravity and having a benzene-insolubles content not greater than about 25.6 percent by weight.

Prior to the present invention, binder pitch has been produced by heat soaking the aforementioned thermal asphalts for either relatively long periods of time (e.g., up to 5 hours) at temperatures of the order of about 750 to 850° F., on a batch basis, or relatively short period of time (e.g., from 5 to 15 minutes) at temperatures of the order of about 900 to 1100° F. on a continuous basis. On a comparative basis, the improved asphaltic compositions of the present invention are prepared by carrying out the heat treatment in the presence of oxygen, e.g., air or other oxygen source. This introduction of oxygen into the reaction results in a polymerization mechanism in which the oxygen reacts with hydrogen present in the asphalt, to produce water, and adds heat values to the system at a molecular level where it is most beneficial, and also results in removing undesirable reaction products. In essence, the ability to utilize oxygen in the heat treatment, makes possible the utilization of significantly lower heat-soaking temperatures, namely, from above 850° F. to not higher than about 1000° F., than have heretofore been employed in conventional heat-soaking operations, where the thermal asphalt was heat-soaked at the aforementioned temperatures in excess of about 1000° F., and even as high as of the order of about 1100° F., but in the absence of oxygen. In accordance with the process of the present invention, the aforementioned polymerization treatment results in upgrading a petroleum asphalt having a specific gravity of at least about 1.1 and a benzene-insolubles content up to 1.3 percent by weight to asphalts of significantly higher and far more desirable specific gravities, for example, of the order of about 1.25 and an increased benzene-insolubles content not greater than about 25.6 percent by weight.

As previously indicated, the improved asphalt compositions of the present invention are prepared from asphalts derived from the thermal (including catalytic) processing of petroleum hydrocarbons. Such petroleum hydrocarbons, particularly contemplated, are those employed in the manufacture of gasolines. Thus, the raw asphalt which is treated in accordance with the process of the present invention may comprise, e.g., as a charge stock, aromatic residues such as are obtained in the thermal processing of straight-run petroleum fractions in the manufacture of gasolines, preferably boiling from about 400° F. to about 1200° F. More specifically, as illustrative of the aforementioned charge-stocks, the latter may comprise a blend of still-tower bottoms from conventional Thermofor catalytic cracking processes.

The thermal processing of petroleum hydrocarbons having a specific gravity of at least about 1.1 and a benzene insolubles content of up to 1.3 percent by weight, in the presence of at least about 0.6 percent by weight of oxygen based upon the weight of asphalt present, as previously indicated, is carried out at a temperature in the range from above 850° F. to about 1000° F. Preferably, this treatment is carried out at a temperature in the range from about 950° F. to about 975° F. In this respect, it is found that increasing the temperature above 850° F. results in an increase of the specific gravity level, but at a much faster rate than that which is obtained when employing a polymerization temperature which is below 850° F. On the other hand, it was also found that by increasing the temperature above 850° F., very little effect was obtained with respect to an increase in the benzene insolubles fraction of the resulting product, which from that point remained essentially constant. The sulfur level of the product was found to depend primarily on the amount of distillate which was formed during the reaction. Thus, it was found that the sulfur level of the binder pitch dropped when the reaction temperature was maintained at about 850° F. or higher.

In accordance with the aforementioned thermal treatment, it was found that as the softening point of the pitch increases, the specific gravity also increases at approximately a linear rate. The smallest increase was found to occur when the products are made by distillation. The greatest increase, on the other hand, was found to have been obtained at the highest processing temperature. Thus, it was found that as the temperature increases, the specific gravity also increases at an accelerating rate. Thus, below about the autogeneous ignition temperature, the increase in specific gravity per 1° F. increase in softening point occurs at a relatively slow rate. Above 850° F., this increase occurs at a much faster rate.

In carrying out the aforementioned thermal processing reaction, it was found that the benzene insoluble material forms rapidly by reason of oxygen being present in the reaction. After a softening point of approximately 150° F. has been reached, the increase in benzene insoluble material is found to be approximately linear with the increase in softening point. The levels thus obtained are found to be higher as the reaction temperature increases from 500° F. to approximately 700° F. Between about 750° F. and about 775° F., the benzene insoluble level drops somewhat, but the rate of increase remains high. When carrying out the thermal processing at temperatures from above 850° F. to about 1000° F., the 20% benzene insoluble level is reached for products having a softening point of about 230° F. In accordance with the observations obtained with respect to the specific gravity, it is found that the Conradson Carbon increases as the reaction temperature is increased. Values within the same range as those normally obtained for satisfactory binder pitches are obtained when the processing temperature is preferably at least about 950° F. or higher.

Insofar as the source of oxygen is concerned, for use in the above-described thermal processing polymerization reaction, any source may be employed which makes available free oxygen for the above purpose. Thus, the source of oxygen may comprise, for example, air, free oxygen, and various materials which have the ability to liberate oxygen during the processing operation, for example, organic and inorganic peroxides.

In general, the above-described polymerization treatment in the presence of oxygen, at temperatures within the aforementioned range from above 850° F. to about 1000° F., makes possible a continuous type operation, requiring only the maintenance of an oxygen source, e.g., an air compressor, without any other attendant complications. From an economic standpoint, it has been found that the addition of relatively small amounts of oxygen will result in relatively high increase of pitch yields. Thus, it is found that the addition of approximately 0.6 weight percent of oxygen, based on the feed stock, results in an increased binder pitch yield of about two percent. Such amount of oxygen yields a pitch of improved quality in which the benzene insolubles are raised by about three percent, and the specific gravity is raised by an amount from about 0.005 to about 0.01, or higher. Such increased yields and improved binder pitch properties are found to result in permitting the easing of furnace severity requirement by at least 50° F. This, correspondingly, permits longer on-stream periods, by reason of diminished tube coking.

The aforementioned combination of liquid asphalt and oxygen in the above-described polymerization treatment occurs in a furnace, or heating vessel, where both liquid and oxygen are in continuous movement. If an excess amount of oxygen is employed, liquid consumption is impeded, and thus no polymerization reaction can occur.

DESCRIPTION OF SPECIFIC EMBODIMENTS

The following examples, and data, are intended to illustrate the preparation of the improved asphaltic compositions of the present invention and their properties, in which the polymerization treatment is carried out as either a batch-type or continuous-type operation; both batch and continuous processes utilized aliquots of the same charge stock.

Table I, below, shows the comparative data obtained in a batch-type operation in which asphalt having a specific gravity of 1.243 (Example 1) is increased to 1.251 (Example 2), through the beneficial effect of oxygen addition, under the temperature conditions indicated.

TABLE I

| Example | 1 | 2 |
|---|---|---|
| Air, wt. percent/hr | 0.0 | [1] 1.4 |
| Operating conditions: | | |
| Pressure, p.s.i.g | 60 | 57 |
| Maximum temp., °F | 822 | 822 |
| Average temp. (>700° F.), F | 774 | 779 |
| Time, min.: | | |
| To 700 F | 104 | 92 |
| 700 F./-800 F | 175 | 135 |
| 800 F./-820 F | 65 | 105 |
| At 820 F | 5 | 1 |
| Total>700 F | 245 | 241 |
| Yields, NLB, wt. percent: | | |
| Gas | 5.0 | 4.0 |
| Gasoline | 2.0 | 1.4 |
| Gas oil | 28.6 | 24.2 |
| Pitch | 64.4 | 69.7 |
| Coke | 0.0 | 0.7 |
| Total | 100.0 | 100.0 |
| Actual recovery | | |
| Pitch properties: | | |
| Sof. Point, R&B, F | 227 | 234 |
| Sp. Gr., 77/77 F | 1.243 | 1.251 |
| Coking value | 50.9 | 51.5 |
| Benzene insol., wt. percent | 20.3 | 25.8 |

[1] Approximately 1.3 c.f.h.

Table II, below, shows the comparative data obtained in a continuous-type operation, in which asphalt having a specific gravity of 1.238 (Example 1) is increased to 1.245 (Example 2) and 1.258 (Example 3) through the beneficial effect of oxygen addition, under the temperature conditions indicated.

TABLE II

| Example | 1 | 2 | 3 |
|---|---|---|---|
| Operating conditions: | | | |
| Temperature, F | 933 | 933 | 931 |
| Pressure, p.s.i.g | 51 | 60 | 400 |
| Feed rate, lb./hr | 5.46 | 5.51 | 5.38 |
| Gas addition: | | | |
| Air, s.c.f.h | 0.0 | 2.0 | 4.6 |
| Nitrogen, s.c.f.h | 2.0 | 0.0 | 0.0 |
| Ratio, s.c.f./min./B | 2.5 | 2.5 | 5.8 |
| Ratio, wt. percent O₂ on feed | 0.0 | 0.6 | 1.5 |
| Residence time, min | 0.80 | 1.16 | 3.01 |

Properties

| Yields, NLB, wt. percent: | | | |
|---|---|---|---|
| Gas | 4.1 | 4.7 | 5.8 |
| Gas oil | 40.2 | 37.8 | 26.9 |
| Pitch | 55.7 | 57.5 | 67.3 |
| Total | 100.0 | 100.0 | 100.0 |
| Recovery | | | |

| Properties: | Charge stock | | | |
|---|---|---|---|---|
| Softening point, R&B, F | 100 | 230 | 230 | 262 |
| Specific gravity, at 77/77F | 1.152 | 1.238 | 1.245 | 1.258 |
| Benzene insoluble, wt. percent | 1.3 | 20.0 | 23.4 | 25.6 |
| Quinoline insoluble, wt. percent | 0.0 | | | 3.0 |
| Coking value, wt. percent | 22.5 | 51.2 | 49.0 | 56.0 |
| Sulfur, wt. percent | 1.22 | | | 1.11 |
| Ash, wt. percent | 0.07 | | | 0.06 |

From the foregoing data and disclosure, it will be noted that the present invention makes possible the formation of improved asphaltic compositions by the treatment of asphalts derived from the thermal processing of petroleum hydrocarbons, such as are employed, for example, in the manufacture of olefins and aromatics, and which possess wide utility in the manufacture of molded carbonaceous articles, as well as for other uses in which asphaltic materials are normally required. In combination with major quantities of carbon particles, the asphaltic compositions of the present invention are particularly useful as binders, as, for example, in the manufacture of improved carbon electrodes, possessing the above-described outstanding properties. It will be noted, however, that other asphalt charge-stocks of the type herein disclosed, may also be similarly treated in accordance with the present invention to produce the novel improved desired asphaltic compositions.

Although the present invention has been described with preferred embodiments, it will be understood that various modifications and adaptations thereof may be resorted to, without departing from the spirit and scope of the invention, as those skilled in the art will appreciate.

I claim:

1. An asphaltic composition obtained by polymerizing a petroleum asphalt, derived from the thermal processing of petroleum hydrocarbons having a specific gravity of at least about 1.1 and a benzene insolubles content of up to 1.3 percent by weight, in the presence of at least about 0.6 percent of oxygen based upon the weight of petroleum asphalt present, at a temperature in the range from above 850° F. to about 1000° F. to produce a petroleum asphalt of increased specific gravity and having an increased benzene insolubles content not greater than about 25.6 percent by weight.

2. An asphaltic composition as defined in claim 1 wherein said polymerization is carried out at temperatures from about 950° F. to about 975° F.

3. An electrode comprising carbon particles and the asphaltic composition of claim 1 as a binder.

4. An electrode comprising carbon particles and the asphaltic composition of claim 2 as a binder.

References Cited

UNITED STATES PATENTS

| 2,560,650 | 7/1951 | Kronstein | 106—273 XR |
| 2,767,102 | 10/1956 | Edson | 106—284 XR |
| 2,992,935 | 7/1961 | Winslow | 106—284 |
| 3,304,192 | 2/1967 | Barrett | 106—284 XR |
| 3,350,295 | 10/1967 | Hamner et al. | 106—284 XR |
| 3,330,759 | 7/1967 | Henschel et al. | 106—279 XR |

JULIUS FROME, Primary Examiner

J. B. EVANS, Assistant Examiner

U.S. Cl. X.R.

106—280, 281; 208—23, 44